United States Patent [19]

Burgdorf

[11] Patent Number: 4,936,638
[45] Date of Patent: Jun. 26, 1990

[54] PRESSURE CONTROL SYSTEM

[75] Inventor: Jochen Burgdorf, Offenbach-Rumpenheim, Fed. Rep. of Germany

[73] Assignee: Alfred Teves GmbH, Frankfurt am Main, Fed. Rep. of Germany

[21] Appl. No.: 336,272

[22] Filed: Apr. 11, 1989

[30] Foreign Application Priority Data

Apr. 20, 1988 [DE] Fed. Rep. of Germany ....... 3813175

[51] Int. Cl.$^5$ .................... B60T 8/32; B60T 13/12; B60T 15/00; G05D 13/00
[52] U.S. Cl. .................... 303/119; 303/9.62; 303/100
[58] Field of Search ............ 303/119, 116, 110, 7, 303/13–15, 68–69, 25–27, 9.62, 9.66, 9.67, 9.68, 9.71, 9.72–9.75, 84.1, 84.2, DIG. 3, DIG. 4, 100, 111, 113, 114, 117; 188/349, 181 R

[56] References Cited

U.S. PATENT DOCUMENTS

| | | | |
|---|---|---|---|
| 3,507,542 | 4/1970 | Cannella | 303/7 |
| 3,549,212 | 12/1970 | Leiber | 303/119 |
| 3,825,308 | 7/1974 | Kasselmann et al. | 303/9.72 X |
| 3,964,794 | 6/1976 | Scholz | 188/349 X |
| 4,199,197 | 4/1980 | Maehara | 303/9.67 |
| 4,592,599 | 6/1986 | Belart | 303/119 |
| 4,685,747 | 8/1987 | Belart et al. | 303/119 X |
| 4,715,667 | 12/1987 | Otsuki et al. | 303/119 |
| 4,729,611 | 3/1988 | Kircher et al. | 303/119 X |
| 4,730,877 | 3/1988 | Seibert et al. | 303/119 X |
| 4,740,039 | 4/1988 | Hattwig | 303/119 X |

FOREIGN PATENT DOCUMENTS

| | | |
|---|---|---|
| 3040561 | 5/1982 | Fed. Rep. of Germany . |
| 3136616 | 3/1983 | Fed. Rep. of Germany . |
| 3136617 | 3/1983 | Fed. Rep. of Germany . |
| 3440541 | 5/1986 | Fed. Rep. of Germany ...... 303/119 |
| 3627000 | 2/1988 | Fed. Rep. of Germany . |
| 0057549 | 5/1981 | Japan ................................. 303/9.67 |

Primary Examiner—Douglas C. Butler
Attorney, Agent, or Firm—Robert P. Seitter

[57] ABSTRACT

An anti-locking control system is provided which is intended for use with a vehicle brake system comprising two actuating circuits disposed in diagonal relationship. While in state-of-the-art brake pressure control systems of the type under consideration, per wheel cylinder, one electromagnetic valve open in de-energized condition and one electromagnetic valve closed in de-energized condition are needed, it is suggested according to the present invention that the open when energized valve of the wheel cylinder of the front axle, in the control mode, performs the brake actuation functions of the matching cylinder, i.e. wheel cylinder, of the same actuation circuit on the rear axle. This is achieved by employment of a pressure-responsive blocking valve blocking the hydraulic conduit leading to the wheel cylinder of the rear axle once a predetermined switchover pressure is reached, thereby forcing the pressure fluid volume intended for the wheel cylinder of the rear axle, to flow through the open when energized valve of the wheel cylinder of the front axle. This construction reduces the number of electromagnetic valves required in the brake actuation circuit.

6 Claims, 2 Drawing Sheets

PRESSURE CONTROL SYSTEM

BACKGROUND OF THE INVENTION

The present invention relates to a brake pressure control system, in particular, to an anti-locking control system, for use with brake systems of automotive vehicles comprising two brake actuating circuits preferably disposed in diagonal relationship, with each of such circuits hydraulically actuating at least one wheel brake cylinder of the front axle and at least one wheel brake cylinder of the rear axle. The brake pressure control system comprises an electronic controller processing wheel sensor signals on the basis of one or more control algorithms and providing, at the output thereof, adjustable flows for electromagnetic valves. Certain electromagnetic valves are open in de-energized condition (SO valves) and other electromagnetic valves are closed in de-energized condition (SG) for controlling the pressure in the wheel brake cylinders during the control mode.

German published Patent Application No. DE 3,136,616 discloses an anti-locking brake system for the wheel brakes of an automotive vehicle of a single- or dual-circuit brake system comprising a control system for controlling the brake pressure in the wheel brake cylinders, employing a 2-way-2-position valve normally switched to passage and being inserted into the common brake conduit of a brake circuit leading to the wheel brake cylinders, which conduit branches into at least two brake channels for associated brake cylinders, with 2-way/2-position valves for individually controllable wheel brake cylinders switched to fluid passage in normal brake events being additionally provided in the brake channels and, per brake circuit, one single 2-way/2-position valves switched to passage in the slip control event being provided in the return flow for the purpose of a pressure decrease of a wheel brake to be controlled.

According to the suggestion of the afore-mentioned German Patent Application, at least one of the brake channels of the brake circuit is in direct communication with a wheel brake cylinder, i.e. with no additional 2-way/2-position valve switched to passage in a normal brake event, with the wheel brake cylinder being associated with the vehicle wheel mostly involved in the total brake effect.

German published Patent Application No. DE 3,136,617, moreover, teaches a brake slip control system for the wheel brakes of an automotive vehicle comprising a control system for controlling the brake pressure in the wheel brake cylinders, wherein an inlet valve normally switched to passage is coupled to the master cylinder for feeding pressure fluid into the wheel brake cylinders, with the brake conduit(s) leading away from the master cylinder being respectively branched into at least two brake channels containing valve elements which, in practical operation, permit an adequate control of the wheel brake cylinders, and with a return flow having at least one outlet valve coupled to a non-pressurized reservoir.

According to the latter-mentioned Patent Application, the valve elements constitute at least one pressure control valve feeding into one of the brake channels at a pressure higher than the pressure in the remaining brake channels, with the one brake channel of elevated pressure being associated with the vehicle wheel of the brake circuit mostly involved in the total brake effect.

In present anti-locking control systems for use with passenger cars, one SO- and one SG-valve will be needed per wheel cylinder to be controlled. Only by way of example, reference is made to German published Patent Application Nos. DE 3,040,561 and DE 3,627,000. In brake pressure control means of that type, it is desirable to reduce the number of electromagnetic valves.

SUMMARY OF THE INVENTION

It is a primary object of the present invention to provide an anti-locking brake pressure control system of the type described which uses a reduced number of electromagnetic valves.

Moreover, it is a further object of the invention to achieve energy savings in connection with the operation of the auxiliary pumps used with special practically employed brake pressure control means.

Finally, it is an object of the present invention to make use of the effect of a change in throttle cross-section during operation of the brake pressure control system.

These and other objects of the invention are achieved by providing a brake pressure control system wherein at least one rear axle wheel cylinder includes a pressure-responsive blocking valve in lieu of an SO-valve, to block the hydraulic actuating conduit for the respective wheel cylinder of the rear axle so that the flow volume intended for the respective wheel cylinder of the rear axle is forced to flow through the SO-valve associated to the matching wheel cylinder of the front axle of the same actuating circuit.

According to another embodiment of the invention, it is provided that the blocking valve is configured as a pressure-responsive blocking valve blocking the hydraulic actuating conduit for the respective wheel cylinder of the rear axle once a predetermined pressure level is reached.

According to a preferred form of embodiment of the invention, it is provided that a brake force distributor is located in the hydraulic actuating conduit between the blocking valve and the respective wheel cylinder of the rear axle.

Moreover, provision is made for a throttle element disposed between the blocking valve and the respective wheel cylinder of the rear axle, in particular, between the brake force distributor and the wheel cylinder.

According to another realization of the principle of the invention, it is provided that associated with the wheel cylinder of the front axle of the actuating circuit are an SO- and an SG-valve and that associated with the wheel cylinder of the rear axle of the same circuit are a pressure-responsive blocking valve, a brake force distributor, a throttle element and an SG-valve.

BRIEF DESCRIPTION OF THE DRAWING

Further details of the invention will become apparent from the following description of one form of preferred embodiment which will now be explained with reference to two illustrations, wherein.

DETAILED DESCRIPTION OF A PREFERRED EMBODIMENT

Figure 1:
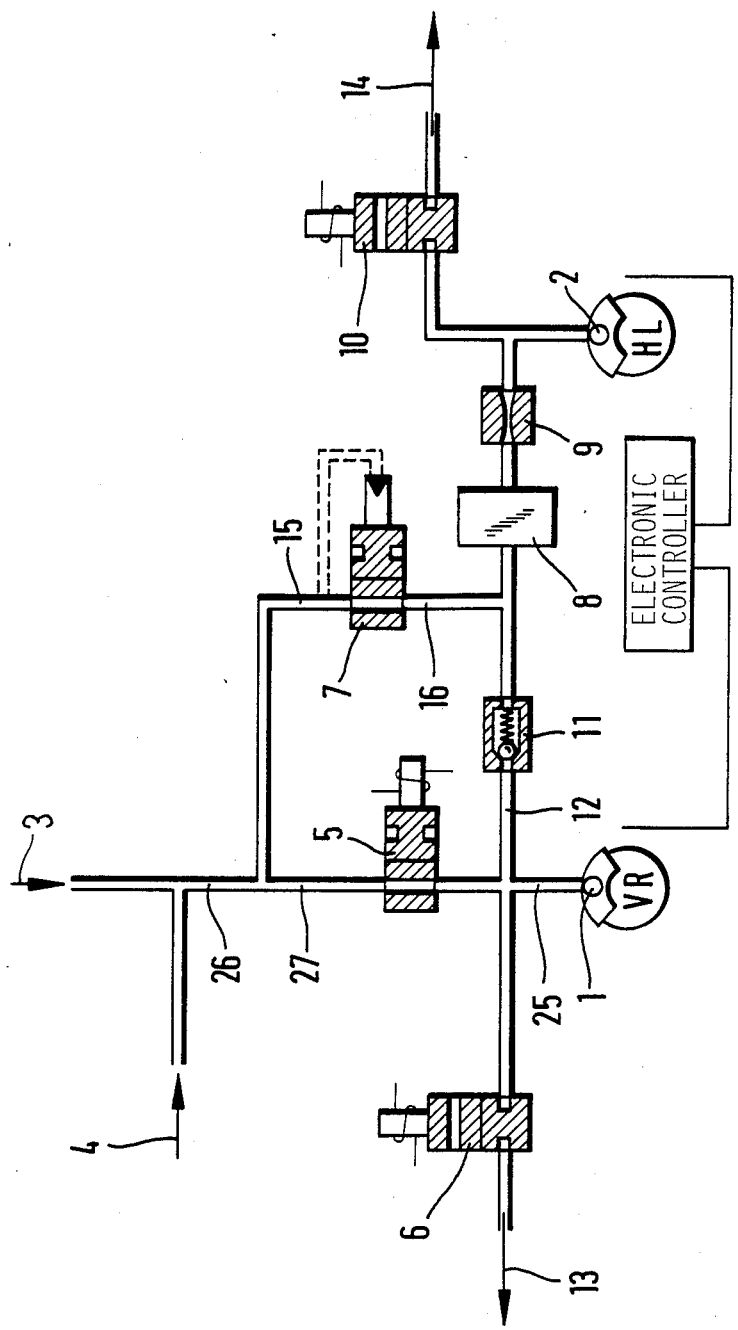
FIG. 1 is a schematic illustration of the hydraulic circuit configuration of the presently disclosed invention.

FIG. 1 shows the hydraulic circuit configuration of a part of an anti-locking control system. The anti-locking control system is part of a dual-circuit brake system. The individual circuits are disposed in diagonal relationship. FIG. 1 shows a diagonal, comprising wheel cylinder 1, right-hand front side (VR), and wheel cylinder 2, left-hand rear side (HL). Numeral 3 designates the pressure conduit connecting the diagonal as shown to the associated working chamber of the tandem master cylinder. Reference character 4 designates the pressure conduit of the auxiliary pump.

Associated with wheel cylinder 1 of the front axle are SO-valve 5 and SG-valve 6. Associated with wheel cylinder 2 of the rear axle are the pressure-responsive blocking valve 7 of the brake force distributor 8, the throttle means 9 and the SG-valve 10. The check valve 11 is located in the hydraulic conduit 12 between SO-conduit 5 and wheel cylinder 2.

Numeral 13 designates the conduit leading from SG-valve 6 to the non-pressurized reservoir. The SG-valve 10, through conduit 14, is in communication with the reservoir.

The pressure-responsive blocking valve 7 is designed for a switch-over pressure of about 20 bar. The switch-over pressure can also be in a different range. It is responsive, among other things, to the vehicle parameters predetermined by the vehicle manufacturer.

Once the pressure level in conduit 15 exceeds 20 bar, the pressure-responsive blocking valve 7 blocks conduit 15, 16. The flow volume intended for wheel cylinder 2, after blocking, flows, via conduits 26, 27, through the SO-valve 5.

Figure 2:
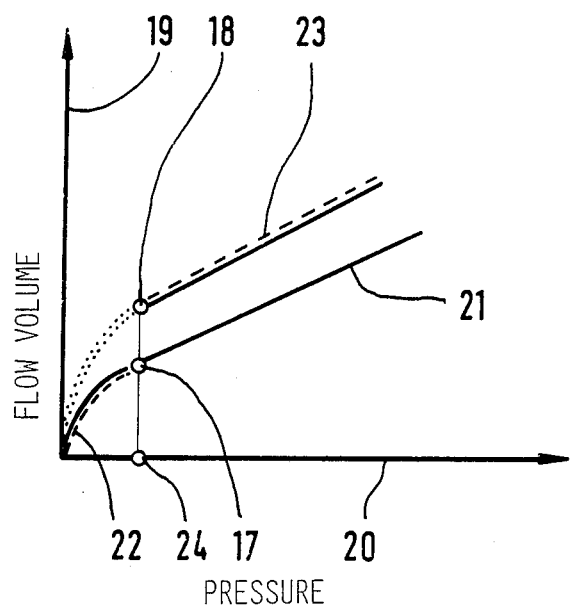
FIG. 2 is a diagram showing the operation of the embodiment of FIG. 1.

The diagram shown in FIG. 2 illustrates this process through changing from point 17 to point 18. Entered on the ordinate 19 of the diagram is the volume flowing through the SO-valve 5 and entered on the abscissa 20 is the pressure prevailing in conduits 15, 26, 27. Curve 21 mirrors the volume which would flow through the SO-valve 5 in the absence of the pressure-responsive valve 7 through the SO-valve. Curves 22, 23 in broken lines which, at the switch-over point 24 and at switch-over pressure, respectively, exhibit the abrupt change in the direction of the ordinate, are indicative of the flow volume through the SO-valve when employing a blocking valve.

Individually, the diagrams convey the following:

Curve 22 shows the rise in the flow volume through the SO-valve 5 for the wheel cylinder 1 of the front axle. Curve 23 shows the rise in the total flow volume through the SO-valve 5 for the wheel cylinder 1 of the front axle and the wheel cylinder 2 of the rear axle once valve 7 has been placed into the blocking position.

Now, the operation of the form of embodiment will be described, namely at a pressure level in the conduits 15, 16, 27 of a pressure below 20 bar. In the normal brake mode, the wheel cylinder 1, through conduits 3, 26, 27, 25 is exposed to the pressure prevailing in the working chamber of the tandem master cylinder associated with the diagonal as shown in FIG. 1. SO-valve 5 is in the open position.

In the anti-locking control mode, the auxiliary pump, through conduit 4, supplies pressure fluid to the system. SD-valve 5, SG-valve 6, SG-valve 10 are switched in the control mode, namely in accordance with the control algorithm installed in the electronic controller.

Closing of the SO-valve 5 and opening of the SG-valve 6 produces a pressure decrease in the wheel cylinder 1. An open SO-valve 5 and a closed SG-valve 6 will result in a re-increase of the pressure in the wheel cylinder 1. Once SG-valve 6 and SO-valve 5 are closed, the pressure in the wheel cylinder 1 is kept constant.

The pressure level in the wheel cylinder 2 of the rear axle, in the normal brake mode and at a pressure level in the conduits 15, 26, 27 below 20 bar, is determined by the hydraulic pressure generated in the associated working chamber of the tandem master cylinder, by the brake force distributor 8 and by the throttle means 9.

In the control mode, the SG-valve 10 controlled by the electronic controller also determines the pressure level in the wheel cylinder 2. Opening of the SG-valve 10 provides pressure decrease, whereas a closed SG-valve provides pressure increase.

As long as the pressure level in the conduits 15, 26, 27 is below 20 bar, pressure fluid flows through the open blocking valve 7, the brake force distributor and the throttle in the wheel cylinder 2 of the rear axle.

Once the pressure in the conduits 15, 26, 27 exceeds the 20 bar level, the pressure-responsive blocking valve closes. Conduits 15, 16 are separated. The volume intended for the wheel cylinder of the rear axle now flows through the SO-valve 5, the brake force distributor 8 and the throttle 9, into the wheel cylinder 2 of the rear axle.

In the control mode, at a pressure level of over 20 bar, the SO-valve 5 and the SG-valve 10 associated with the wheel cylinder 2 of the rear axle will perform the pressure modulation in the wheel cylinder 2.

FIG. 1 conveys that, in the practice of the invention, a total of only six electromagnetic valves are needed of a brake system having two brake circuits disposed in diagonal relationship as compared with the large number of electromagnetic valves provided according to German published Patent Applications Nos. DE 3,040,561 and DE 3,627,000. The reduced number of valves is provided by the principle of the present invention, wherein the SO-valve 5 of the wheel cylinder 1 of the front axle is also used for controlling the pressure in the wheel cylinder 2 of the rear axle leading to a change in throttle cross-section as a result of the abruptly increased flow volume. Such a change in throttle cross-section involves advantages; moreover, energy savings are permitted in advantageous manner.

What is claimed is:

1. A brake pressure control system, especially an anti-locking control system, for use with a vehicle brake system comprising two brake actuation circuits disposed in diagonal relationship, each of the brake actuation circuits hydraulically actuating at least one wheel brake cylinder of the front axle and at least one wheel brake cylinder of the rear axle, comprising an electronic controller processing wheel sensor signals on the basis of one or more control algorithms and providing, at the output thereof, regulating flows for electromagnetic valve means in each brake actuation circuit comprising a first electromagnetic valve open in de-energized condition and second electromagnetic valves closed in de-energized condition controlling the pressure in the wheel brake cylinders during the brake pressure control mode, a pressure-responsive blocking valve associated with at least one wheel cylinder of the rear axle blocking the hydraulic actuation conduit for the respective wheel cylinder of the rear axle when actuated, thereby forcing a flow volume intended for the respective wheel cylinder of the rear axle to flow through the first valve associated with a matching wheel cylinder of the front axle of the same brake actuation circuit.

2. A brake pressure control system according to claim 1, wherein the blocking valve (7) is configured as a pressure-responsive valve blocking the hydraulic actuation conduit (15, 16) for the respective wheel cylinder (2) of the rear axle once a predetermined pressure level (24) in the brake pressure control system is reached.

3. A brake pressure control system according to claim 1, wherein disposed in the hydraulic actuation conduit between the blocking valve (7) and the respective wheel cylinder (2) of the rear axle is a brake force distributor (8).

4. A brake pressure control system according to claim 3, wherein disposed between the brake force distributor (8) and the wheel cylinder (2), is a throttle element (9).

5. A brake pressure control system according to claim 3, wherein disposed between the blocking valve (7) and the respective wheel cylinder (2) of the rear axle is a throttle element (9).

6. A brake pressure control system, especially an anti-locking control system, for use with a vehicle brake system comprising two brake actuation circuits disposed in diagonal relationship, each of the brake actuation circuits hydraulically actuating at least one wheel brake cylinder of the front axle and at least one wheel brake cylinder of the rear axle, comprising an electronic controller processing wheel sensor signals on the basis of one or more control algorithms and providing, at the output thereof, regulating flows for electromagnetic valve means comprising a first electromagnetic valve open in de-energized condition and second electromagnetic valves closed in de-energized condition controlling the pressure in the wheel brake cylinders during the brake pressure control mode, a pressure-responsive blocking valve associated with at least one wheel cylinder of the rear axle blocking the hydraulic actuation conduit for the respective wheel cylinder of the rear axle when actuated, thereby forcing a flow volume intended for the respective wheel cylinder of the rear axle to flow through the first valve associated with a matching wheel cylinder of the front axle of the same brake actuation circuit, wherein associated with the wheel cylinder (1) of the front axle of the brake actuation circuit are an electromagnetic valve open in the de-energized condition (5) and a first electromagnetic valve closed in the de-energized condition (6), and that associated brake actuation circuit with the wheel cylinder (2) of the rear axle of the brake actuation circuit are a pressure-responsive blocking valve (7), a brake force distributor (8), a throttle element (9) and a second electromagnetic valve closed in the de-energized condition (10).

* * * * *